Sept. 22, 1931.   R. H. JELLICOE   1,823,902

CHUCK

Original Filed Dec. 27, 1926

Inventor
Richard H. Jellicoe
By Geo. H. Kennedy Jr.
Attorney

Patented Sept. 22, 1931

1,823,902

UNITED STATES PATENT OFFICE

RICHARD H. JELLICOE, OF WORCESTER, MASSACHUSETTS, ASSIGNOR TO THE HEALD MACHINE COMPANY, OF WORCESTER, MASSACHUSETTS, A CORPORATION OF MASSACHUSETTS

CHUCK

Original application filed December 27, 1926, Serial No. 157,144. Divided and this application filed September 26, 1928. Serial No. 308,390.

The present invention relates to work holding devices or chucks, especially those adapted to hold annular or hollow workpieces in position to be operated upon interiorly by a tool, grinding wheel or the like. This application is a division of my prior copending application Serial No. 157,144, filed December 27, 1926.

The present invention, like that of my aforesaid copending application, is particularly applicable to the chucking of workpieces whose bores or internal surfaces to be operated upon are already drilled, turned or rough-ground to true circles; according to the invention, each such workpiece successively presented to the chuck is automatically centered with reference to its bore, and held in such centered position, so that the operation of finishing said bore to a desired diameter can be accomplished with a minimum removal of stock. It is an easy matter then to bring the exterior surface of such workpieces into exact concentricity with said bores, by mounting the interiorly finished piece on an arbor and turning or grinding down said exterior surfaces.

According to the present invention, the chuck provides a centrally located centering member or plug which is projected outwardly therefrom, in position to engage and center a workpiece, when the chuck jaws are opened. The centering plug is resiliently held in this position, and upon engagement of the workholding jaws with the article to be ground or otherwise operated upon, it is forced rearwardly until the workpiece engages a stop in the form of a front plate or the like. Thereupon, by further movement of the chuck actuating rod or draw bar, as it is termed, the centering plug is withdrawn out of the way to permit the grinding wheel or other tool to traverse back and forth inside the workpiece.

The construction and mode of operation of a particular embodiment of the present invention will hereinafter more fully appear from the following detailed description, with reference to the accompanying drawings, in which:—

Like reference characters refer to like parts in the different figures.

Figure 1:
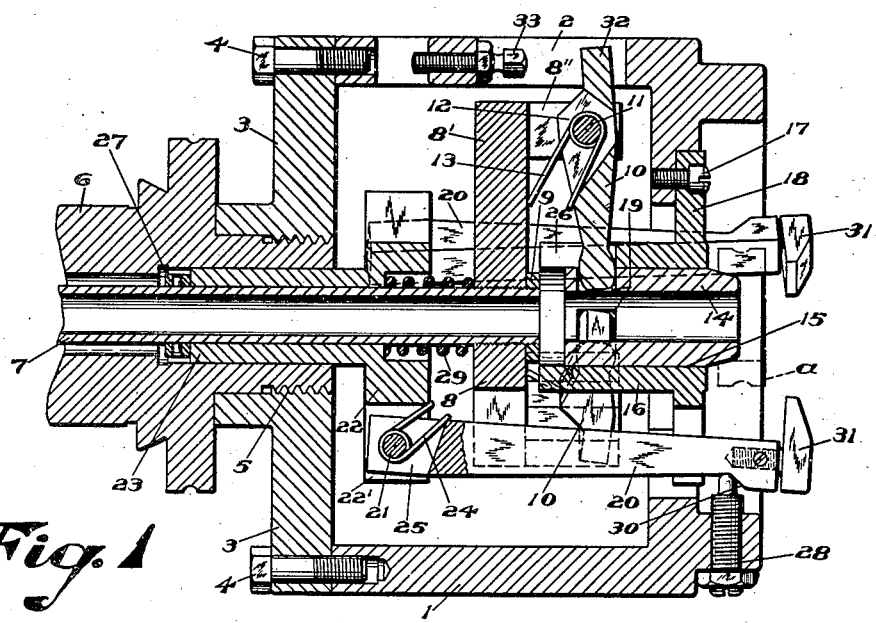
Fig. 1 is a sectional axial view of the chuck or workholding device in open position.

Referring to the drawings, the clamping means and the centering means of the chuck, together with their operating devices hereinafter described, are preferably inclosed in a substantially cylindrical shell or casing 1, which in the illustrated embodiment of my invention, provides three longitudinal slots 2 therein. Said shell 1 is fastened at its inner end to a plate 3 by means of bolts 4; the plate 3 is secured in any suitable way, as by the screw threads 5 to the end of a suitable journaled work rotating spindle or shaft 6, here shown as made hollow for the longitudinal movement therein of a rod 7 adapted, when moved to the right to open the chuck, and when moved to the left to close it. The construction, arrangement and operation of the parts which are operated by said rod 7 will now be set forth in detail.

A member 8 has a screw threaded connection with the front end of rod 7, a check nut 9 serving to hold it rigidly in place. The member 8 has three radial arms 8', each one of which provides a pair of ears 8'' for the pivotal attachment of three levers 10 by means of pivot pins 11. The levers 10 are longitudinally slotted at 12, thus leaving a space around the pins 11; coil springs 13 surround these pins 11, said springs having straight extensions bearing, respectively, against the sides of arms 8' and against the ends of the slots 12. It will be readily seen that the springs 13 tend to press the inward ends of lever 10 towards the front of the chuck.

The yielding centering plug 14 is a generally cylindrical member with its front end tapered. Its axis coincides exactly with the axis of rotation of the chuck and it is received slidably in the internal cylindrical bore 15 of a member 16, which is detachably fastened to the casing 1, as by screws 17 extending through a slotted flange 18 of said member 16. The cylindrical wall of the plug 14 is broken by three recesses 19 near its left hand end, and each of these recesses receives the rounded inner end of one of the three levers 10.

The workholding means of the chuck is here shown as a set of clamping fingers 20 which are mounted on pivot pins 21 in three pairs of ears 22', provided by the forward enlargement 22 of a sleeve 23 which is slidably mounted on the rod 7. The fingers 20 extend through the aforesaid slots in the flange 18 and are pressed outwardly by means of springs 24, surrounding the pins 21, the extensions of said springs pressing against the enlargement 22 and against the ends of slots 25 in the fingers 20.

When the rod 7 is in its extreme right hand position as shown in Fig. 1, the tapered front end of the plug 14 projects beyond the mouth of the cylindrical surface 15, being held there by the action of the levers 10 under the influence of springs 13. The inward ends of levers 10 pass through slots 26 in the wall of member 16 and engage the ends of said slots. The sleeve 23 and enlargement 22 are held to the right by a collar 27 attached in any suitable way to the rod 7. And the fingers 20 consequently project from the front of the chuck, being distended by the springs 24, and each finger 25 being engaged near its free end by an adjustable screw 28, carried by the shell 1.

With the chuck in the open position shown by Fig. 1, the operator, in the act of loading the same with a workpiece a, first impales said workpiece on the plug 14, as shown in Fig. 1, and then causes the usual left hand closing movement of the draw rod 7. This movement carries the collar 27 to the left, and the sleeve 23 follows said collar, carrying with it the fingers 20, by reason of a spring 29 interposed between enlargement 22 and the member 8. As the fingers 20 move to the left, cam surfaces 30 on each finger are drawn across the noses of adjustable screws 28, and the fingers are thereby forced together. This brings jaws 31 on said fingers into engagement with the workpiece a. This engagement forces the plug 14 to the left against the action of the springs 13;—eventually the workpiece engages the annular mouth of the member 16 which is rigid, and the workpiece is thus clamped in centered position by the jaws 31.

Figure 2:
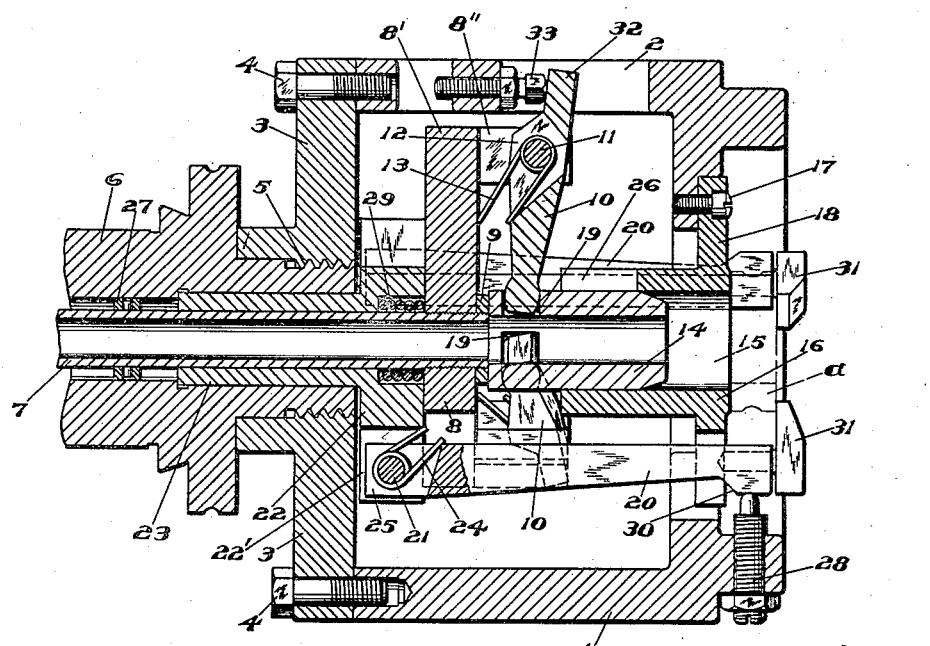
Fig. 2 is a view similar to Fig. 1, showing the chuck in closed position.

At the start of the clamping action, but before the spring 29 has become fully compressed, the levers 10 have been carried to the left far enough so that the outward ends 32 of said levers (which are located in the slots 2) engage adjustable screws 33 carried by the shell 1 and located in said slots 2. These screws are adjustable so as to permit variation of the initial movement of the plug 14 relative to the movement of the jaws 31, thus to adapt the chuck to workpieces of different thicknesses. Up to this time the levers have kept the plug 14 pressing against the workpiece a, the levers 10 swinging counterclockwise as the member 8 retreats, but upon the engagement of the outer ends 32 with the screws 33, the levers 10 are swung quickly in the other direction by reason of the shortness of said outer extensions 32, and this action withdraws the plug 14 well into the bore 15, as shown in Fig. 2. This withdrawal action is accomplished by a very slight movement of the rod 7 beyond the point where the clamping started, owing to the leverage described, and when the workpiece is fully clamped, the plug 14 is well out of the way of a tool, grinding wheel, or the like, operating in and through the bore of workpiece a. Movement of the rod to the right after the operation on the workpiece has been completed releases said workpiece, and places the chuck and centering plug in the position illustrated in Fig. 1, in condition for the centering and chucking of a new workpiece, as will be understood.

It will be apparent that once the members 8 and 22 have come together there can be no further movement of the member 8 and consequently no further movement of the levers 10 nor of the centering plug 14. The plug must at that time be well withdrawn, and consequently the parts must be set so as to provide for considerable movement of the draw bar 7 and member 8 after the jaws 31 contact with the workpiece a. Therefore the spring 29 is made heavy enough to cause the jaws 31 to hold the workpiece a very firmly practically upon initial engagement therewith, the draw bar spring, not shown, being of course stronger still.

Having thus described my invention, which relates specifically to the use of a movable centering plug for centering the workpiece, I wish it understood that the invention herein claimed, while specific in the sense that it is to be distinguished from the use of separate fingers for centering the work as shown in my aforesaid copending application, is not restricted to the particular form of plug or the means for actuating it shown in the accompanying drawings and herein described, but is suscepticle of various modifications and is only to be limited by the fair import of the following claims.

I claim,

1. In a chuck, workpiece-clamping means comprising clamping fingers and a cooperating backing plate against which the workpiece is pressed by the action of said fingers, in combination with a member for centering said workpiece, said member being slidably mounted in the axis of said backing plate and means for procuring rapid withdrawal of said centering member away from contact with said workpiece after said workpiece is centered.

2. In chucking mechanism for workpieces, a work-centering plug, a work-clamping mechanism, means for actuating both said plug and said mechanism, and means for withdrawing said plug into said chuck away from contact with the centered workpiece after said clamping mechanism comes into operation.

3. In chucking mechanism for workpieces, a work-centering plug, resilient means to urge said plug into operative position, work-holding means, an actuating device to move the work-holding means into operative position, and means responsive to such operation of said actuating device for withdrawing said centering plug from contact with a workpiece held by said work-holding means.

4. In chucking mechanism for workpieces, a draw rod, a member attached to said draw rod, a work-centering plug slidably and axially mounted in said chuck, and levers to withdraw said plug within said chuck, said levers being actuated by the member attached to said draw rod.

5. In mechanism as claimed in claim 4, the combination with the parts therein specified, of work clamping devices, and connections between said devices and the draw rod whereby the latter may actuate both the clamping devices and the centering plug in timed sequence.

6. In chucking mechanism for workpieces, a set of work clamping fingers, a work centering plug, and means for causing said fingers to clamp a workpiece in position and means for thereafter withdrawing said plug quickly into said chuck.

7. In a chuck, the combination with work-holding means and a draw rod movable to render the same operative and inoperative, of a centering plug, actuating means for said centering plug connected to said draw rod, and further means to accelerate the movement of said centering plug independent of said draw rod.

8. In a chucking mechanism for workpieces, a work-centering plug, work-clamping mechanism adapted to exert a longitudinal pressure on a workpiece, resilient means for actuating said work-clamping mechanism, thus to center the workpiece against said plug, and positive means to remove the plug from the workpiece to permit operation thereon by a tool.

9. In a chucking mechanism for workpieces, a plurality of jaws, means to draw said jaws inwardly of said chuck in a longitudinal direction, means against which a workpiece is pressed by the foregoing actuation of said jaws, a centering plug, and means to press said plug resiliently against the workpiece after the jaws engage said workpiece in workholding position to center the same.

10. In a chucking mechanism for workpieces, a work-centering plug, a backing plate past which said plug is adapted to project, resilient means to force said plug against a workpiece, and further means for drawing said work-centering plug from said workpiece after centering thereof.

RICHARD H. JELLICOE.